(12) United States Patent
Behmlander

(10) Patent No.: US 7,559,188 B2
(45) Date of Patent: Jul. 14, 2009

(54) HARVESTER ROLLERS WITH FINGERS AND LIFTING AND CONVEYOR MECHANISMS

(76) Inventor: Jefferson Herbert Behmlander, 1231 S. Finn Rd., Munger, MI (US) 48747

( * ) Notice: Subject to any disclaimer, the term of this patent is extended or adjusted under 35 U.S.C. 154(b) by 33 days.

(21) Appl. No.: 11/384,805

(22) Filed: Mar. 20, 2006

(65) Prior Publication Data

US 2007/0214764 A1  Sep. 20, 2007

(51) Int. Cl.
*A01D 45/00* (2006.01)
(52) U.S. Cl. .................................... 56/327.1
(58) Field of Classification Search ............... 56/327.1, 56/14.5, 119; 171/26, 28, 14, 61; 15/80
See application file for complete search history.

(56) References Cited

U.S. PATENT DOCUMENTS

| | | | | |
|---|---|---|---|---|
| 2,438,500 A | * | 3/1948 | Hertzler | 198/535 |
| 2,504,193 A | * | 4/1950 | Gough et al. | 56/124 |
| 2,599,715 A | * | 6/1952 | Lepper | 56/328.1 |
| 2,633,685 A | * | 4/1953 | Edwards | 171/28 |
| 3,330,363 A | * | 7/1967 | Greedy | 171/1 |
| 3,387,611 A | * | 6/1968 | Looker | 460/130 |
| 3,521,710 A | * | 7/1970 | Tillotson | 171/61 |
| 3,536,140 A | * | 10/1970 | Looker | 171/61 |
| 3,581,747 A | * | 6/1971 | Scribner | 460/130 |
| 3,942,590 A | * | 3/1976 | Friedel et al. | 171/5 |
| 4,234,045 A | * | 11/1980 | Porter | 171/14 |
| 4,262,477 A | * | 4/1981 | Turold et al. | 56/327.1 |
| 4,335,570 A | * | 6/1982 | Fitzmaurice | 56/327.1 |
| 4,524,572 A | | 6/1985 | Wilde et al. | |
| 4,965,993 A | | 10/1990 | Butler et al. | |
| 4,971,594 A | * | 11/1990 | Gallenberg | 460/100 |
| 5,042,240 A | * | 8/1991 | Rocca et al. | 56/16.6 |
| 5,077,963 A | * | 1/1992 | Harrison et al. | 56/327.1 |
| 5,197,269 A | * | 3/1993 | Meester | 56/327.1 |
| 5,329,661 A | * | 7/1994 | Smith | 15/80 |
| 5,964,081 A | * | 10/1999 | Ingram | 56/14.5 |

* cited by examiner

*Primary Examiner*—Árpád Fábián-Kovács
(74) *Attorney, Agent, or Firm*—Reising Ethington PC

(57) ABSTRACT

A harvester having a frame, with multiple components operably connected to the frame. The components that are operably connected to the frame are a cutting mechanism, a lifting mechanism, a plurality of conveyor mechanisms, at least one roller, and a stripper mechanism. Thus, the crops are lifted from the ground, placed on the harvester, and the crops are stretched and detangled in order to separate a desired portion of the crops from an undesired portion of the crops.

21 Claims, 4 Drawing Sheets

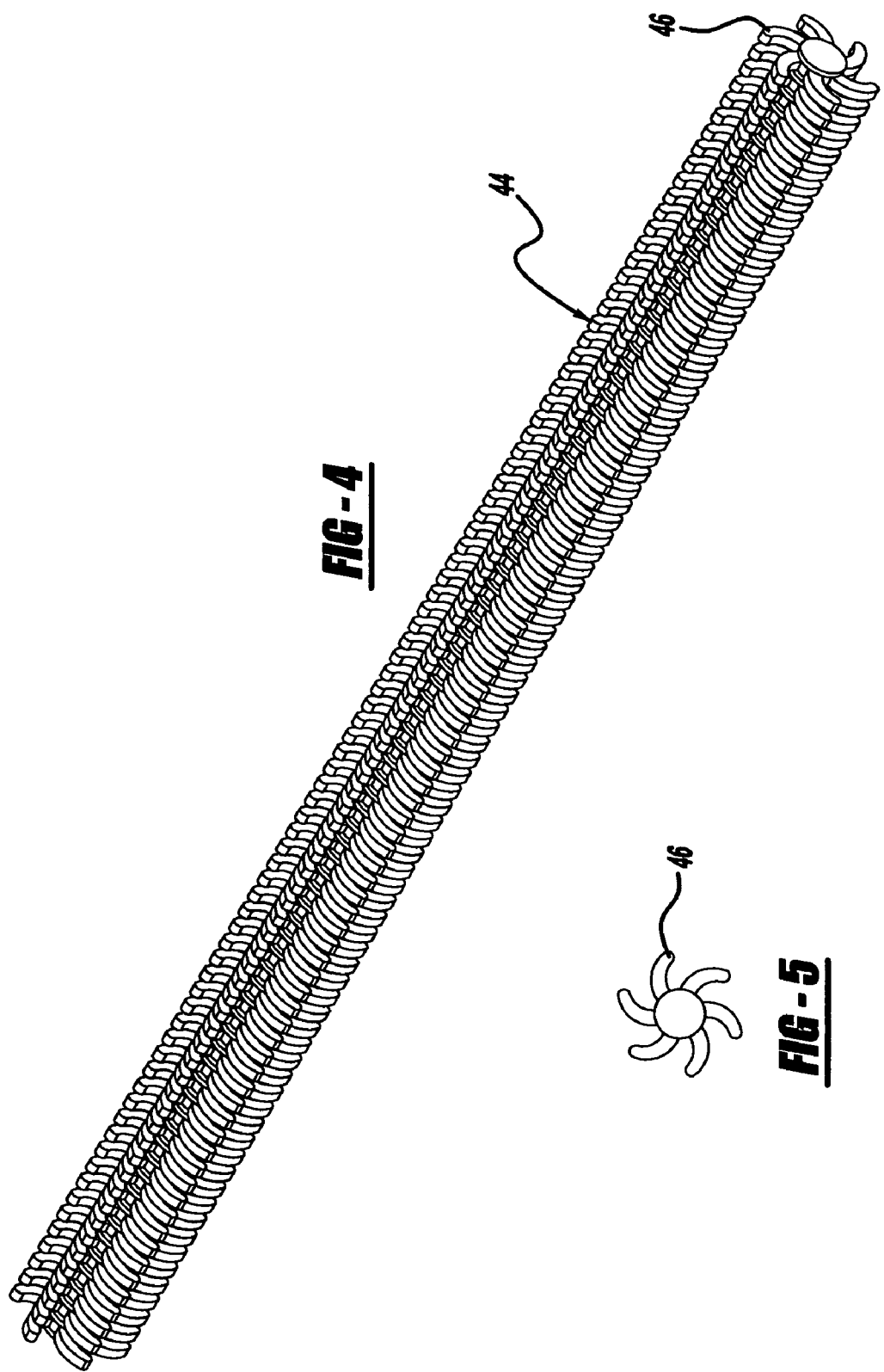
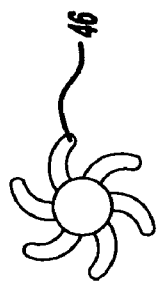

HARVESTER ROLLERS WITH FINGERS AND LIFTING AND CONVEYOR MECHANISMS

FIELD OF THE INVENTION

The present invention relates to a harvester which is used for removing crops from the ground.

BACKGROUND OF THE INVENTION

In view of modern farming techniques, it is desirable to use machinery for planting and harvesting of crops in order to reduce the amount of man power needed to farm a parcel of land. Thus, the use of machinery allows more land to be farmed while using less man power. The sophistication of these farming machines allows a single person to plant acres of crops in a short period of time. Likewise, the farming machines allow a single person to harvest acres of crops in a short period of time. However, the use of these farming machines is efficient and economical only when the machine is capable of harvesting the crops while causing minimal damage to the crops.

For example, cucumbers are difficult to harvest due to the cucumbers being attached to vines. In addition, the harvesting of cucumbers are difficult due to the varying size of the cucumbers which are attached to the vines. Thus, as the cucumbers are harvested, the vines get tangled upon itself and other vines, which makes it difficult for the cucumbers to be detached from the vines. Also, as the vines get tangled upon the harvester machine, which makes it difficult for the cucumbers to become detached from the vine and causes damage to the cucumbers.

One known harvester is shown in U.S. Pat. No. 4,965,993 to Butler et al. This device used a pinch bar assembly to move the cucumbers from the ground to the conveyor.

It is desirable to develop a harvester which is capable of harvesting crops with long vines and prevent tangling of the vines or detangle the vines in order to prevent damage to the desirable portions of the crops. Thus, it is desirable to have a harvester which stretches the vines, which causes the vines to detangle and prevents the vines from tangling upon the harvester. Once the vines are stretched and detangled, the desirable portion of the crops, such as a cucumber, is easily detached from the vines no matter the size of the cucumber.

SUMMARY OF THE INVENTION

The present invention relates to a harvester for harvesting crops. In a first embodiment, the harvester comprises a frame adapted to be connected to a motorized vehicle. The harvester further comprising a cutting mechanism operably connected to the frame. At least a portion of the cutting mechanism is placed below the ground while in operation. A lifting mechanism is operably connected to the frame. A conveyor mechanism is operably connected to frame, and extends between a first end and a second end. The conveyor mechanism coacts with the lifting mechanism to guide the crops. At least one roller having a plurality of fingers is operably connected to the frame. The first roller is adjacent the second end of the conveyor.

In a second embodiment, the harvester comprises a frame adapted to be connected to a motorized vehicle. The harvester further comprises a cutting mechanism operably connected to the frame. At least a portion of the cutting mechanism is placed below the ground while in operation. A lifting mechanism is operably connected to the frame. A first conveyor mechanism, having a plurality of rods, coacts with the lifting mechanism to guide the crops. At least a portion of the plurality of rods have a plurality of flexible fingers extending transversely. At least one roller having a plurality of roller fingers is operably connected to the frame. The first roller is adjacent the first conveyor mechanism. A second conveyor mechanism is operably connected to the frame adjacent the first roller. A stripper mechanism is operably connected to the frame, and is adjacent the second conveyor mechanism. The stripper mechanism has a plurality of rollers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a perspective view of a first roller in accordance with a preferred embodiment of the present invention; and FIG. 5 is a plan view of a single element of the first roller.

DETAILED DESCRIPTION OF THE PREFERRED EMBODIMENTS

The following description of the preferred embodiment(s) is merely exemplary in nature and is in no way intended to limit the invention, its application, or uses.

Figure 1:
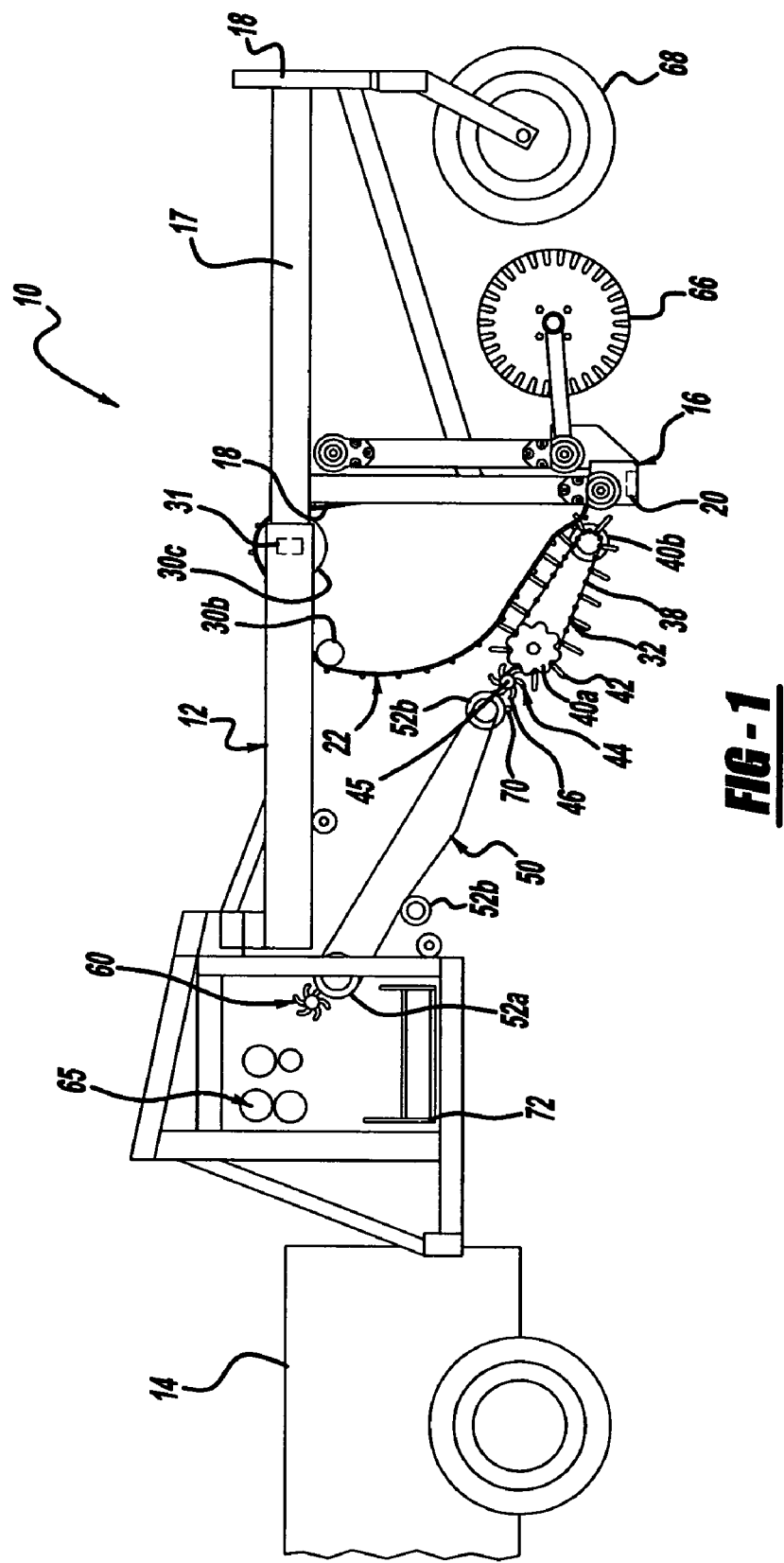
FIG. 1 is a schematic plan view of a preferred embodiment of the present invention.

Referring to FIG. 1, a harvester for removing crops from the ground is generally shown at 10. The harvester 10 has a frame, generally shown at 12, which provides a structure for the various components to be attached. The frame 12 is adapted to be connected and disconnected to a motorized vehicle 14 in any well known manner. In a preferred embodiment, the vehicle 14 is a tractor or combine, but any vehicle 14 that is capable of supporting the frame 12 in order to function the harvester 10 is within the scope of the present invention. In a preferred embodiment, the frame 12 extends forwardly from the vehicle 14 a predetermined length in order to accommodate all the components of the harvester 10. Furthermore, the frame 12 can be any desired width in order to accommodate the components and cover a predetermined amount of area. For example, the width can be made so as to simultaneously harvest four rows. Alternatively, the width can be made so as to simultaneously harvest six rows. It will be apparent that any width may be used.

The frame 12 may be moveable between an operating position and a raised position (not shown). That is, the frame 12 may include hydraulic cylinders connected to the vehicle's hydraulic system that are operable to raise and lower the frame 12. In this manner, the frame 12 can be moved to a lower operable position as shown for harvesting crops. The frame 12 can be raised to a non-operable position so that the harvester 10 can be transported to various locations.

A cutting mechanism generally indicated at 16, is operably connected to the frame 12. In a preferred embodiment, the cutting mechanism 16 comprises a vibrating blade that is at least placed partially below the ground in order to severe the crops from the ground. In the preferred embodiment, the cutting mechanism 16 extends the entire width of the frame 12 in order to maximize the area in which the harvester 10 is capable of harvesting in a single pass.

The frame 12 comprises a top support 17, which has a plurality of legs 18 that extend from the top support towards the ground. The cutting mechanism 16 extends between the legs 18, so that the cutting mechanism 16 extends the entire width of the harvester 10. Also attached to the legs 18 is a driving device 20 which is used to vibrate the cutting mechanism 16. In a preferred embodiment there is a driving device 20 on both legs 18, which is for example but not limited to, an electric motor or a hydraulic motor that is operably connected to the power system of the motorized vehicle 14.

Figure 2:
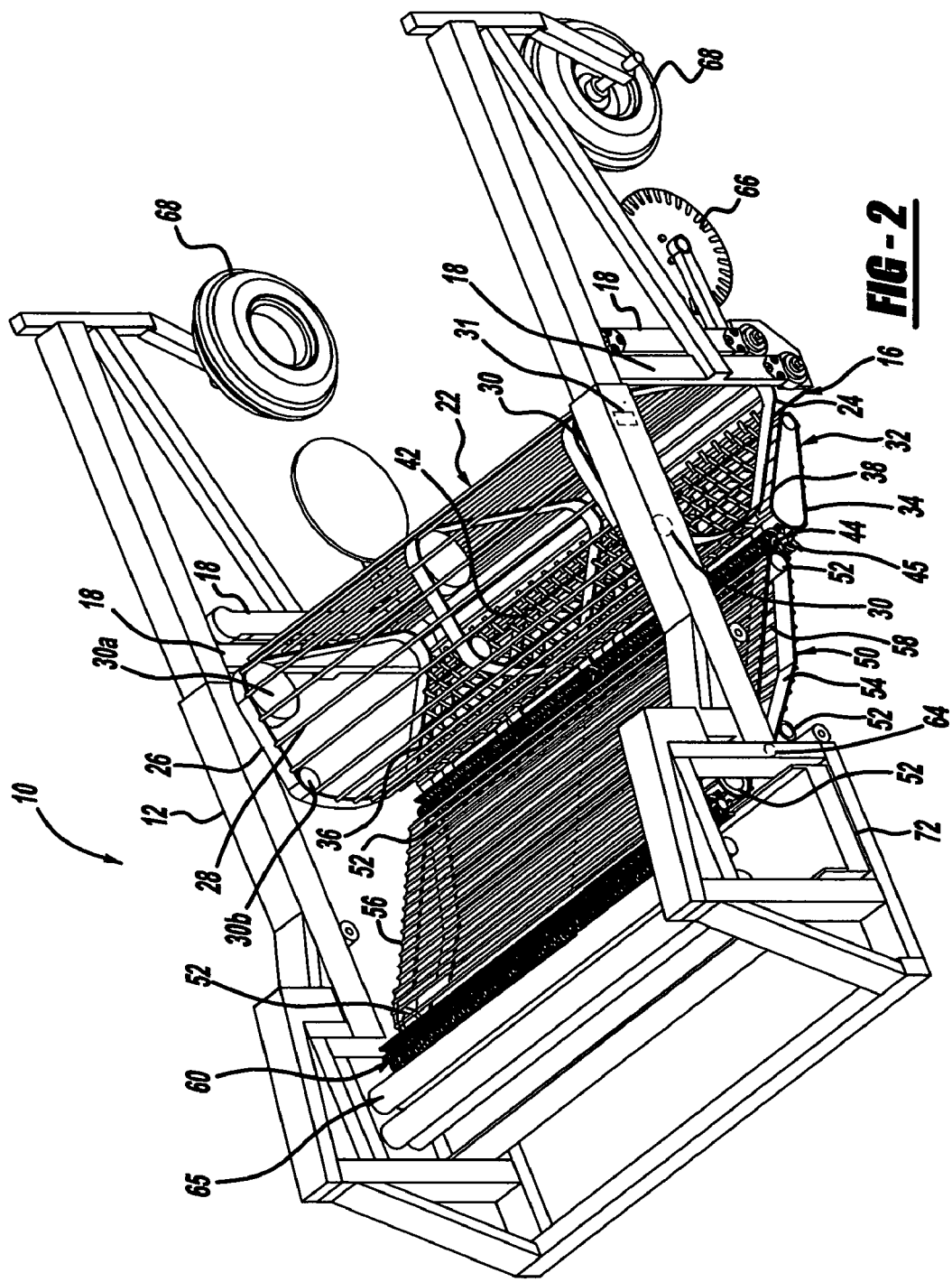
FIG. 2 is a perspective view of a preferred embodiment of the present invention where a portion of a frame is removed.
Figure 3:
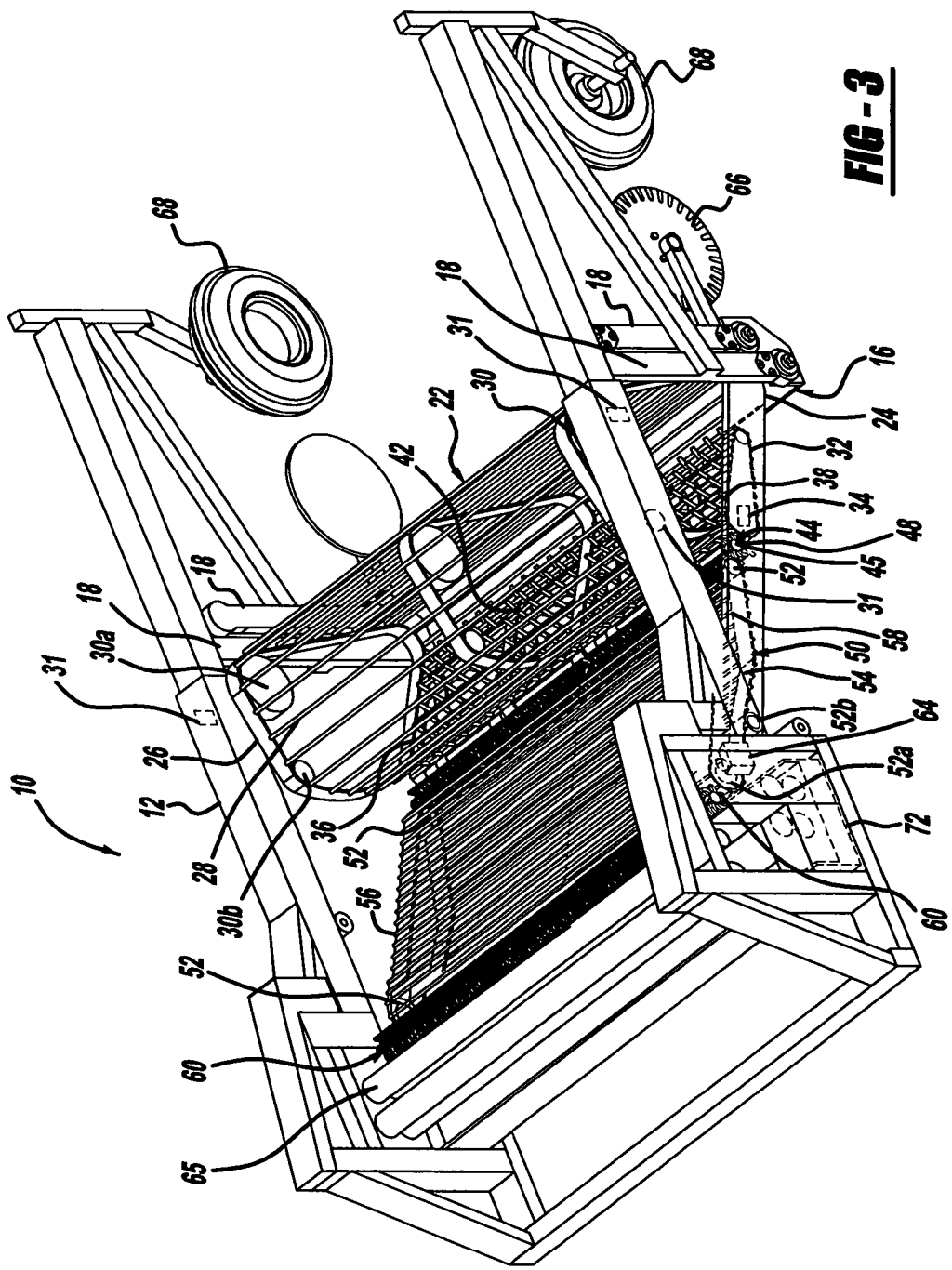
FIG. 3 is a perspective view of a preferred embodiment of the present invention.

A lifting mechanism or hugger, are generally indicated at 22, is operably connected to the frame 12 for lifting vines onto a conveyor mechanism generally indicated at 32. As best shown in FIGS. 2 and 3, the lifting mechanism 22 preferably comprises of a first belt 24 on an edge, a second belt 26 on an opposite edge, and a plurality of rods 28 extending between the first belt 24 and the second belt 26. Thus, a first end of the rod 28 is connected to the first belt 24 and a second end of the rod 28 is connected to the second belt 26. It is preferred that the rods 28 extend substantially parallel between the first belt 24 to the second belt 26. The rods 28 are spaced from adjacent rods 28. The rods 28 are adjacent to conveyor mechanism 32 to support the crops while allowing dirt or other debris to fall between the rods 28 back to the ground.

Typically, the first belt 24 and second belt 26 rotate about two sprockets 30a, 30b. By rotating about two sprockets 30a, 30b, the lifting mechanism 22 is capable of moving substantially vertical toward the ground and then move partially horizontally or diagonally in order to lift the crops off the ground and place the crops onto the conveyor mechanism 32. Preferably the lifting mechanism 22 has enough slack, as shown in FIG. 1, so that the lifting mechanism 22 acts with the conveyor mechanism 32 to lift or hug the crops between the lifting mechanism 22 and conveyor mechanism 32. In a preferred embodiment, the rods 28 are made of metal, for durability reasons and that the weight of the rods 28 causes the extra slack in the lifting mechanism 22 to sag over the conveyor mechanism 32. It should be appreciated that any number of sprockets 30a, 3b can be used, so long as the lifting mechanism 22 is capable of coacting with the conveyor mechanism 32 for lifting the crops off the ground.

In a preferred embodiment, the sprockets 30a, 30b are operably connected to the frame 12. Further, it should be apparent that in some instances additional belts may be used placed between the first belt 24 and second belt 26 in order to add additional support for the rods 28. Thus, depending on the width of the harvester 10, additional belts may be beneficial in order to support the rods 28 along the width in order to support the weight of the crops. The lifting mechanism 22 is rotated by a driving device 31 that is operably connected to the frame 12. The driving device 31 is, for example but not limited to, an electric motor or a hydraulic motor that is operably connected to the power system of the motorized vehicle 14 in a well known manner. Preferably, the driving device 31 is operably connected to the driven sprocket 30a in order to move the lifting mechanism 22. The remaining sprocket 30b is an idler, and rotates due to the motion of the driven sprocket 30a and the lifting mechanism 22.

As set forth above, the harvester 10 further comprises the conveyor mechanism 32, operably connected to the frame 12 which is used to move the crops along the harvester 10. The conveyor mechanism 32 extends between a first end adjacent the ground and a second end spaced from the first end adjacent the ground.

The conveyor mechanism 32 has a first belt 34 on one edge, and a second belt 36 on an opposite edge, and a plurality of rods 38 extending between the first belt 34 and the second belt 36. A first end of the rod 38 is connected to the first belt 34 and a second end of the rod 38 is connected to the second belt 36. It is preferred that the rods 38 extend substantially parallel to one another. Further, the first belt 34 and second belt 36 typically move about two sprockets 40a, 40b in order for the conveyor mechanism 32 to move the crops. The sprockets 40a, 40b are operably connected to the frame 12. Furthermore, each rod 38 is spaced from the next adjacent rod 38 so that dirt from the crops and other debris falls between the rods 38, but the rods 38 supports the crops as the crops move along the conveyor mechanism 32. Depending on the width of the harvester 10, additional belts are used to adequately support the rods 38. The conveyor mechanism 32 is rotated by a driving device 41 that is operably connected to the frame 12. In a preferred embodiment the driving device 41 is an electric motor or hydraulic motor that is operably connected to the power system of the motorized vehicle 14 in a known manner. Preferably, the driving device 41 is operably connected to the driven sprocket 40a in order to move the conveyor mechanism 32. The remaining sprocket 40b is an idler, and rotates due to the motion of the driven sprocket 40a and the conveyor mechanism 32.

The rods 38 have a plurality of fingers 42 that extend traverse to and outwardly from the rods 38. Typically, the fingers 42 extend in a single direction from the rods 38, so that the fingers 42 extend towards the crop when the crops are placed on the rods 38. In a preferred embodiment, the fingers 42 are made of a rubber or flexible material so that the fingers 42 are rigid enough to grip or move the crops, but are flexible in order to bend when a sufficient amount of force is applied to the fingers 42 in order to prevent damage to the crops. These fingers 42 engage the crops, such as the cucumber vines, and helps lift them off of the ground. The fingers 42 also aid in conveying the vines. In addition, rods 38 which do not have fingers 42 are preferably placed between rods 38 that do have fingers 42 in order to provide proper spacing of the fingers 42 and for additional support for the crops on the conveyor mechanism 32.

A first roller, generally indicated at 44, is positioned adjacent the top end of the conveyor mechanism 32. The roller has an axle 45 that extends across the width of the frame between the legs 18 in order to support the first roller 44. The first roller 44 has a plurality of fingers or roller fingers 46 that are circumferentially placed around the first roller 44. Typically, the first roller 44 is connected to a driving device 48 on the frame 12 which rotates the first roller 44. The driving device 48 is preferably an electric motor or a hydraulic motor that is operably connected to the power system of the motorized vehicle 14 in a known manner.

The fingers 46 on the first roller 44 are used to stretch or detangle the crops from themselves and grab the crops from the conveyor mechanism 32. The fingers 46 are preferably made of a flexible or rubber material so that the fingers 46 grab the crops in order to stretch and detangle the crops. However, the fingers 46 flex when a sufficient amount of force is applied to the fingers 46 in order to prevent damage to the crops. It should be appreciated that the fingers 46 are capable of being made of any material, so long as the fingers 46 are rigid enough in order to stretch or detangle the crops. In a preferred embodiment, the fingers 46 have an arcuate shape, so that the fingers 46 better grasp the crops 46 in order to stretch and detangle the crops 40. Thus, the fingers 46 are able to reach between the fingers 42 of the conveyor mechanism 32 in order to grab the crops off of the conveyor mechanism 32.

A second conveyor mechanism generally indicated at 50, is operably connected to the frame 12. The second conveyor mechanism 50 moves about a spread of sprockets 52a, 52b adjacent the first roller 44. A gap 70 is provided between the first roller and the second conveyor mechanism 50. The gap 70 preferably comprises an adjustable dirt gap 70, which allows dirt to be ejected from the conveyor mechanism 50. Thus, the dirt falls through the dirt gap 70 while the vines are passed from the first roller 44 to the second conveyor mechanism 50. The dirt gap 70 is preferably adjustable so that the dirt gap 70 is altered depending on the crops and dirt conditions. Typically, the dirt gap 70 is adjustable by a threaded adjustment mechanism or a hydraulic adjustment mechanism. It will be appreciated that the dirt gap 70 may be fixed. In this manner, the gap 70 remains constant and is not changeable by the operator.

The sprockets 52a, 52b are operably connected to the frame 12. Similar to the conveyor mechanism 32, the second conveyor mechanism 50 comprises a first belt 54 at one edge, a second belt 56 on a second edge, and a plurality of rods 58 that extend between the first belt 54 and the second belt 56. Thus, a first end of the rods 58 is connected to the first belt 54 and a second end of the rods 58 is connected to the second belt 56, such that the rods 58 extend substantially parallel to one another.

Typically, the plurality of sprockets 52a, 52b are operably connected to the frame 12. Preferably, a driving device 60 is operably connected to a driven sprocket 52a so that the sprocket 52a rotates and causes the second conveyor mechanism 50 to move. The sprocket 52b is an idle sprocket which guides the second conveyor mechanism 50 and moves due to the rotation of the driven sprocket 52a and the movement of the second conveyor mechanism 50. The driving device 60 is preferably an electric motor or a hydraulic motor that is operably connected to the power system of the motorized vehicle 14 in a known manner.

Also, each rod 58 is preferably spaced from the adjacent rod 58 which allows dirt from the crops and other debris from falling through the rods 58, but the rods 58 are close enough to support the crops. Furthermore, additional belts may be used in order to adequately support the rods 58 depending on the width of the harvester 10. Furthermore, the rods 58 create a substantially flat surface in order for the second conveyor mechanism 50 to transport the crops as the second conveyor mechanism 50 rotates about the plurality of sprockets 52.

A second roller, generally indicated at 60, is operably connected to the frame 12, and a plurality of fingers or roller fingers 62 are circumferentially placed around the second roller 60. The second roller 60 is similar to the first roller 44, in that the roller is operably connected to the frame 12 by a driving device 64 that rotates the second roller 60. As described above, the driving device 64 is preferably a hydraulic or electric motor that is operably connected to the power system of the motorized vehicle 14 in a known manner. Typically the fingers 62 are made of a flexible or rubber material so that the fingers 62 are rigid enough to move the crops, but a sufficient amount of force causes the fingers 62 to bend in order to prevent or reduce damage to the crops. The second roller 60 has a similar function as the first roller 44, in that the second roller 60 grabs the crops by the flexible fingers 62 and is used to stretch or detangle the crop. Also, the second roller 60 is used to move or fluff the crops in order for the stripper mechanism 65 to more effectively remove the desirable portions of the crops, as described below, when compared to the crops not being fluffed. In an alternate embodiment, the second roller 60 does not have fingers 62. The second roller 60 is a bumped roller or ribbed roller that moves or fluffs the crops.

The harvester 10 further comprises at least one circular cutter 66. The circular cutter 66 is operably connected to the frame 12 so that the circular cutter 66 is disposed at least partially in the ground when the harvester 10 is in the operating position. In a preferred embodiment, there are two circular cutters 66 on opposite sides of the frame 12 and the circular cutter 66 is a metal blade that is rotated as the harvester 10 is in operation in order to cut the crops that are outside the width of the harvester 10. Thus, the circular cutters 66 are preferable placed on the outside peripheral edge of the frame 12. The circular cutters 66 severs the vines of the crops that are within the width of the harvester 10 from the crops that are outside the width of the harvester 10, which results in reducing the tangling between the vines of the crops inside and outside the width of the harvester 10.

The harvester 10 further comprises at least one wheel 68 operably connected to the frame 12, such that the wheel 68 supports the frame 12 when the harvester 10 is in the operating position. In a preferred embodiment, there are two wheels on opposite sides of the frame 12, and the wheels 68 are on a front portion of the frame 12 or the portion of the frame 12 farthest from the vehicle 14. Typically, the wheel 68 is includes a rubber tire, but any suitable wheel 68 that is capable of supporting the frame 12 is used. Preferably, the wheel 68 is adjustable with respect to the frame 12, such that the height of the frame 12 and the components which are operably connected to the frame 12 are dependent upon the position of the wheel 68. Such an adjustment can be made in a well known manner.

The harvester 10 further comprises a stripper mechanism generally indicated at 65. The stripper mechanism 65 comprises of a plurality of rollers in which the crops pass through the plurality of rollers of the stripper mechanism 65. The stripper mechanism 65 moves the crops with a sufficient amount of velocity and force so that the desired portion of the crop is separated from the undesired portion of the crop. Then the desired portion of the crop is dropped into a first location or typically a collection bin and ultimately conveyed in the usual manner. The undesired portion of the crop is deposited into a second location or typically the ground. Such a stripper 65 is well known in the art.

In operation, the frame 12 is connected to the vehicle 14, in which the vehicle 14 supplies the power to the components operably connected to the frame 12. The height of the frame 12 relative to the ground when in the operating position, is controlled by the placement of the wheel 68, so that the wheel 68 is positioned at a desired height in order to keep the cutting mechanism 16 at a desired depth in the ground and the lifting mechanism 22 and conveyor mechanism 32 a desired height from the ground. In a preferred embodiment, the harvester 10 is used for the harvesting of cucumbers for pickles which have long vines in which the desired portion of the crop is attached to the vine. Thus, as the vehicle 14 moves the harvester 10, the circular cutter 66 on the outside peripheral edge of the frame 12 cuts the portion of the crops or vines which are outside the width of the frame 12. The circular cutter 66 helps prevent the lifting mechanism 22 from lifting a portion of the crops which are outside the width of the frame 12 and reduces tangling of the vines between crops that are within the width of the frame 12 and the crops that are outside the width of the frame 12.

As the harvester 10 is being moved by the vehicle 14, the cutting mechanism 16, in the form of a vibrating blade, is being moved along at least partially under the ground in order to sever the vines from the ground. After the vines have been severed from the ground by the cutting mechanism 16, the lifting mechanism or hugger 22, preferably in conjunction with the conveyor mechanism 32, lifts the crops from the ground and place the crops onto the conveyor mechanism 32. Preferably the lifting mechanism has enough slack so that the lifting mechanism 22 coacts with the conveyor mechanism 32 to guide the crops along the conveyor mechanism 32. In an alternate embodiment, the lifting mechanism 22 is only used to move the crops from the ground to the conveyor mechanism 32.

The flexible fingers 42 on the conveyor mechanism 32 contact the crops in order to move the crops along the conveyor mechanism 32 from a first end adjacent the ground to a second end adjacent the first roller 44. The fingers 42 grasp the vines in order to move the crops, but are flexible and bend in order to prevent or reduce damage to the cucumbers. The crops are then accepted from the conveyor mechanism 32 by the first roller 44, which utilizes flexible fingers 46 to stretch and detangle the vines of the crops. Typically, as the crops move along the first conveyor mechanism 32, the crops settle in between the rods 38 and the fingers 42. The preferred shape of the fingers 44 allow for the fingers 42 to reach between the rods 38 and fingers 42 in order to grab the crops from the first conveyor mechanism 32.

After the first roller 44 stretches and detangles the vines of the crops, the second conveyor mechanism 50 accepts the crops at a first end which is adjacent the first roller 44. Dirt is removed through the dirt gap 70.

The second conveyor mechanism 50 then moves the crops towards the stripper mechanism 65. In a preferred embodiment, the second roller 60 is placed at a second end of the second conveyor mechanism 50 between the second conveyor 50 and the stripper mechanism 65. The second roller 60 is similar to the first roller 44, such that the second roller 60 has the plurality of fingers 62 that are used to stretch and detangle the vines. The crops then pass from the second roller 60 to the stripper mechanism 65. However, in an alternate embodiment, the second roller 60 is removed and the crops pass from the second conveyor mechanism 50 directly to the stripper mechanism 65.

As the crops pass through the stripper mechanism 65, the crops pass through the plurality of rollers of the stripper mechanism 65 so that the desired portions of the crops are separated from the undesired portion of the crop in a well known manner. The rollers of the stripper mechanism 65 move the crops with a sufficient amount of velocity and force so that the pickle or cucumber is separated from the vine. Then the cucumber is dropped from the stripper mechanism 65 into a collection bin 72 or another device used for collection of crops. Then the undesirable portions of the crop or the vines are discharged from the stripper mechanism 65 to the ground.

Even though the above description of the harvester 10 in operation dealt with the harvesting of cucumbers, it is within the scope of the present invention that the harvester 10 is used for harvesting of any crop that it is desirable to straighten or detangle the crops from upon themselves.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A harvester for harvesting crops comprising:
   a frame adapted to be connected to a motorized vehicle;
   a cutting mechanism operably connected to said frame, wherein at least a portion of said cutting mechanism is placed below the ground while in operation;
   a lifting mechanism operably connected to said frame and rotatable about a plurality of sprockets;
   a conveyor mechanism operably connected to said frame, extending between a first end and a second end, said conveyor mechanism comprising a plurality of spaced apart rods having a plurality of flexible fingers extending transversely from said rods, said flexible fingers adapted to contact the crops in order for the crop to be placed on said conveyor mechanism and said flexible fingers being capable of flexing when a force is applied to said flexible fingers in order to reduce damage to the crop, said conveyor mechanism coacting with said lifting mechanism to guide crops; and
   a first roller having a plurality of roller fingers is operably connected to said frame, wherein said first roller is adjacent said second end of said conveyor; wherein said lifting mechanism coacts with said conveyor mechanism to hug crops therebetween.

2. The harvester as set forth in claim 1, wherein said cutting mechanism comprises a vibrating blade that is at least partially placed below the ground in order to sever the crops from the ground.

3. The harvester as set forth in claim 1, wherein said lifting mechanism comprises a plurality of rods having a first end connected to a first belt and a second end connected to a second belt, such that said plurality of rods are substantially parallel with one another.

4. The harvester as set forth in claim 1, wherein said plurality of rods, of said first conveyor mechanism have a first end connected to a first belt and a second end connected to a second belt so that said plurality of rods are substantially parallel to one another.

5. the harvester as set forth in claim 1, wherein said plurality of roller fingers have an arcuate shape.

6. The harvester as set forth in claim 1, wherein said roller fingers are circumferentially placed around said first roller.

7. The harvester as set forth in claim 1, wherein said roller fingers are flexible to allow flexing when a force is applied to said roller fingers in order to prevent damage to the crops.

8. The harvester as set forth in claim 1 further comprising:
   a second conveyor mechanism adjacent said roller adapted to convey crops;
   a stripper mechanism operably connected to said frame adjacent said second conveyor mechanism;
   a dirt gap defined between said roller and said second conveyor mechanism, wherein said dirt gap allows dirt attached to the crops to be separated from the crops; and
   a second roller adjacent said second conveyor mechanism and said stripper mechanism.

9. The harvester as set forth in claim 8, wherein said second conveyor mechanism comprises a plurality of rods operably connected to said frame adjacent said first roller, wherein a first end is connected to a first belt and a second end is connected to a second belt so that said plurality of rods are substantially parallel to one another.

10. The harvester as set forth in claim 8, wherein said stripper mechanism is a plurality of rollers.

11. The harvester as set forth in claim 8, wherein said second roller comprises fingers that have an arcuate shape and are circumferentially placed around said second roller.

12. The harvester as set forth in claim 1 further comprising:

at least one circular cutter operably connected to said frame, wherein said at least one circular cutter is at least partially in the ground when said harvester is in operation; and at least one wheel operably connected to said frame, wherein said at least one wheel supports said frame when said harvester is in operation, and said at least one wheel is adjustable with respect to said frame.

13. A harvester for harvesting crops comprising:

a frame adapted to be connected to a motorized vehicle;

a cutting mechanism operably connected to said frame, wherein at least a portion of said cutting mechanism is placed below the ground while in operation;

a lifting mechanism operably connected to said frame and rotatable about a plurality of sprockets;

a first conveyor mechanism having a plurality of rods coacting with said lifting mechanism to guide crops, wherein at least a portion of said plurality of rods have a plurality of flexible fingers extending transversely said lifting mechanism coacting with said conveyor mechanism to hug crops therebetween;

a first roller having a plurality of roller fingers is operably connected to said frame, wherein a first roller is adjacent said first conveyor mechanism;

a second conveyor mechanism that is operably connected to said frame adjacent said first roller; and a stripper mechanism that is operably connected to said frame adjacent said second conveyor mechanism, wherein said stripper mechanism is a plurality of rollers.

14. The harvester as set forth in claim 13, wherein said cutting mechanism comprising a vibrating blade that is placed below the ground in order to sever the crops from the ground.

15. The harvester as set forth in claim 13, wherein said plurality of rods of said lifting mechanism comprises a first end connected to a first belt and a second end connected to a second belt, such that said plurality of rods are substantially parallel with one another.

16. The harvester as set forth in claim 13, wherein said first conveyor mechanism has a plurality of rods having a first end connected to a first belt and a second end connected to a second belt so that said plurality of rods are substantially parallel to one another.

17. The harvester as set forth in claim 13, wherein said roller fingers have an arcuate shape.

18. The harvester as set forth in claim 13, wherein said roller fingers are circumferentially placed around said first roller.

19. The harvester as set forth in claim 13, wherein said roller fingers are flexible when a force is applied to said flexible fingers in order to prevent damage to the crops.

20. The harvester as set forth in 13, wherein said second conveyor mechanism has a plurality of rods having a first end connected to a first belt and a second end connected to a second belt so that said plurality of rods are substantially parallel to one another.

21. The harvester for removing crops from the ground of claim 13 further comprising:

at least one circular cutter and at least one wheel operably connected to said frame, wherein said at least one circular cutter is at least partially in the ground when said harvester is in operation;

at least one wheel operable connected to said frame, wherein said at least one wheel support said frame when said harvester is in operation, and said at least one wheel is adjustable with respect to said frame;

a second roller operably connected to said frame comprising a plurality of fingers having an arcuate shape and circumferentially placed around said second roller; and a dirt gap defined by said first roller and said second roller, wherein said dirt gap allows dirt attached to the crops to be separated from the crops.

* * * * *